Aug. 2, 1949.
A. F. PITYO ET AL
2,477,894
METHOD OF AND APPARATUS FOR FORMING
AND WELDING CONTACTS
Filed April 23, 1948
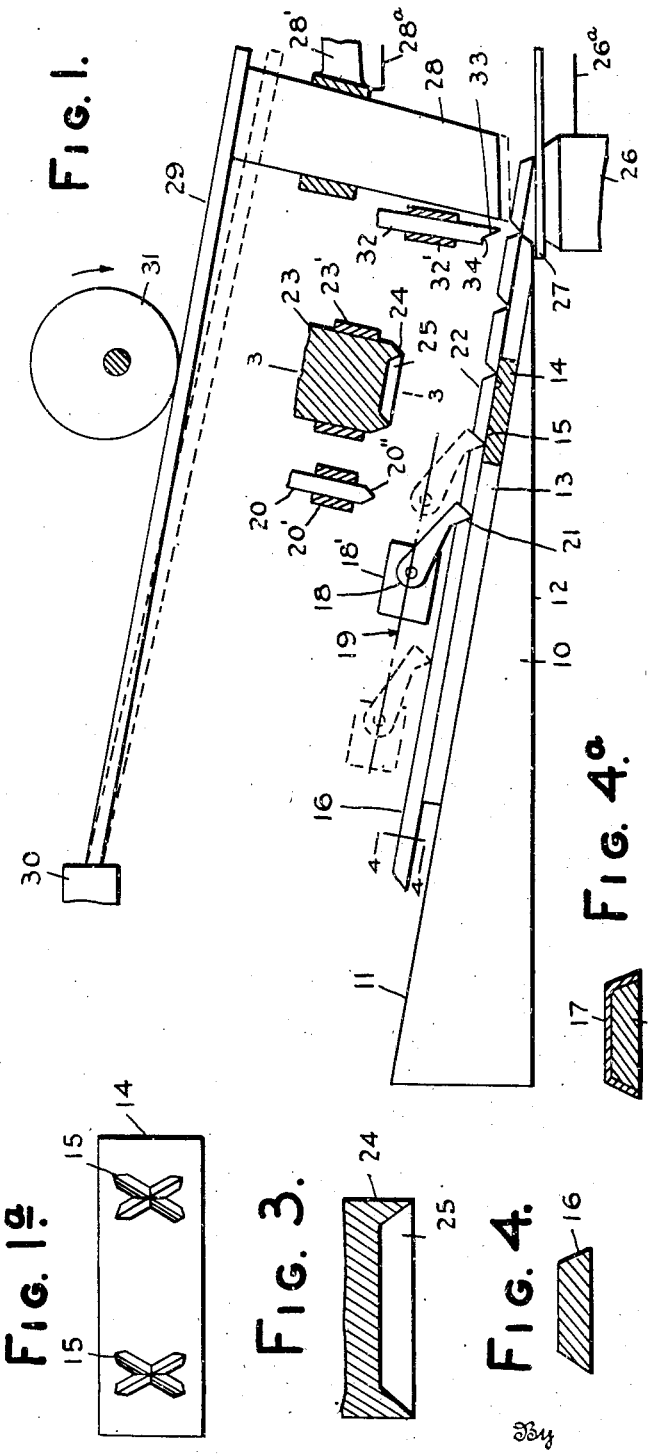
Inventors
ALBERT F. PITYO &
HARRY E. BUTTERFIELD, JR
By BPJWilburn Patented Aug. 2, 1949

2,477,894

UNITED STATES PATENT OFFICE 2,477,894

METHOD OF AND APPARATUS FOR FORM-ING AND WELDING CONTACTS

Albert F. Pityo, Clifton, and Harry E. Butterfield, Jr., Maplewood, N. J.

Application April 23, 1948, Serial No. 22,896

15 Claims. (Cl. 219—4)

The present invention relates to a method of and apparatus for forming and welding contacts to metallic members.

An important object of the invention is to provide a method of the above mentioned character for forming contacts upon a rod or wire and retaining them connected so that the leading contact may be brought into position over the metallic member or spring to which it is to be welded, without liability of the contact being lost.

A further object of the invention is to provide a method for feeding the leading contact into close or contacting relation with the metallic member before the severing and welding steps.

A further object of the invention is to advance the connected contacts in an inclined plane, to bring the lower leading end of the leading contact into engagement with the metallic member and to exert a yielding pressure upon the high end of the leading contact before the severing and welding steps.

A further object of the invention is to provide a machine by means of which the various steps may be performed in proper order and sequence.

Other objects and advantages of the invention will be apparent during the course of the following description.

In the accompanying drawings, forming a part of this application, and in which like numerals are employed to designate like parts throughout the same, Figure 1 is a side elevation, partly diagrammatic, and with parts in section, of apparatus employed in the practice of the method, Figure 1a is a plan view of the rib forming die, Figure 2 is an enlarged side elevation of the blade and movable electrode and associated elements, Figure 3 is a transverse section taken on line 3—3 of Figure 1, Figure 4 is a transverse section through the rod or wire taken on line 4—4 of Figure 1, Figure 4a is a similar view through a modified form of rod or wire, Figure 5 is a plan view of the same, Figure 6 is a side elevation of the contact, Figure 7 is an enlarged section taken on line 7—7 of Figure 5.

In the drawings, wherein for the purpose of illustration we have shown apparatus used in the practice of the method, the numeral 10 designates a stationary table having an inclined top or face 11. The bottom 12 of this table is horizontal and the face 11 may be inclined at an angle of about 30 degrees to the horizontal. Rigidly mounted upon the upper face 11 is a liner 13, having an opening formed therein for receiving a die 14. This die has recesses 15 formed upon its upper surface, which recesses may be X-shaped, Figure 1a. Each recess portion is V-shaped in cross-section. The die is held stationary by any suitable means.

The metal rod or wire 16 from which the contacts are formed is arranged upon the liner 13 and fed longitudinally thereof and suitably guided in such movement. This rod may be trapezoidal in cross-section, Figure 4, although it may be formed in any other suitable shape in cross-section, such as square, round, triangular, etc. The rod 15 may be formed of a base or precious metal or may be formed of a base metal having a coating 17 of precious metal, Figure 4a. The rod 16 is fed in a step-by-step manner, by a pivoted feed dog 18, mounted upon a carriage 18' reciprocated upon a line 19. This carriage is guided in its movement and reciprocated by any suitable means, operated in timed order. The dog engages in notches formed in the rod 16, as will be described.

Arranged at a notching position is a reciprocatory notching or nicking punch 20 held in stationary guide 20' and having a lower beveled or tapered end 20". The punch 20 is reciprocated by any suitable means. The rod 16 is moved a step and then brought to rest and the punch 20 descends, forming the notch 21. This notch forms the ends of the adjacent contacts 22 and partly severs them, but these contacts remain connected by a reduced web at their bottoms. This web may have a thickness of three thousandths of an inch (.003"). The contact may have a width of twenty-thousandths of an inch (.020"). These dimensions of course may vary. After the notch 21 is formed by the punch 20, the punch is returned to the raised position and the dog is moved forwardly and will slide upon the upper face of the rod 16 until the notch 21 is reached and will drop into the notch and will advance the rod a step equal to the length of the contact. The rod 16 is held against rearward movement and the dog 18 is now moved rearwardly and leaves the notch 21 and returns to a position rearwardly of the punch. While the rod is stationary, the punch again descends to form the next notch 21. Each notch 21 therefore is formed in succession and the notches are equidistantly spaced whereby the contacts 22 are of uniform length. These notches produce roughly formed contacts 22, and each contact is fed intermittently in succession over the die 14. Mounted to reciprocate over the die 14 in a stationary guide 23' is a forming or restrike punch 23, having a tapered or beveled edge 24 at its bottom and a recess 25. This edge extends about the ends and sides of the recess 25, and the contact 22 enters the recess 25 and the beveled ends 24 enter the notches. This punch further forms or shapes the contact and also presses the same down against the die 14, whereby the metal of the contact 22 is formed into the grooves 15 of the die 14, forming the raised high resistance ribs 22' upon the bottom of the contact. These ribs taper outwardly and may have a vertical dimension of three-thousandths of an inch (.003"). The purpose of these ribs is to produce the maximum resistance at the instant that the welding current is turned on. The punch 23 is guided and raised and lowered by any suitable means. The punch 23 while further forming and shaping the contacts, does not sever the contacts, which remain connected by the thin webs.

The forward end of the liner 13 is positioned over a lower stationary electrode 26 at the severing and welding station. Electrode 26 is stationary and is adapted to receive the companion metallic member or spring 27 upon which the contact is to be welded. When the rod 16 is advanced each step, the leading connected contact 22 is brought over the metallic member or spring 27, in close relation thereto. Since the liner 13 is inclined, the contacts are fed in an inclined plane and the leading end of the leading contact will engage the metallic member or spring 27. Arranged upon the stationary electrode 26 is an upper reciprocatory electrode 28, mounted upon a leaf spring 29, secured to a fixed support 30. The electrode 28 operates in a stationary guide 28'. The leaf spring shifts the electrode 28 to the raised position out of the path of travel of the leading contact, and the leaf spring 29 is depressed by a cam or eccentric 31, mounted above the same, and rotated by any suitable means. When the cam 31 is turned, it will depress the leaf spring 29, which is placed under tension and will yieldingly force the movable electrode 28 downwardly into engagement with the high trailing end of the leading contact 22 before such contact is severed.

Disposed rearwardly of and near the electrode 28 is a reciprocatory blade 32, held in a stationary guide 32' and moved by any suitable means. This blade has a beveled end 33 and a shoulder 34. When the blade is moved down to the end of its stroke, the shoulder contacts with the top of the next rear contact 22, while the pointed end 35 moves to an elevation beneath the contact 22 and upper face 11. The leading end of the liner 13 terminates short of the point 35 of the beveled end 33 when the blade descends, Figure 2, so that there is no liability of these parts engaging. The electrodes 26 and 28 are connected with wires 26a and 28a of the welding circuit.

The practice of the method in connection with the apparatus is as follows:

With the elements 20, 23, 28 and 32 in the stationary raised position, the dog 18 moves forwardly and drops into the rear notch and advances the rod 16 a step and the rod is then brought to rest. This brings a pair of notches 21 and the roughly formed contact 22 over the die 14, and the leading contact which has been formed, over the member or spring 27. The parts are now in the position shown in Figure 1. The dog 18 now travels to the rearmost position out of the path of travel of the punch 20. The punch 20, punch 23, and blade 32 may move down substantially simultaneously, but the movable electrode 28 moves down into yielding engagement with the leading contact 22 before blade 32 severs such contact. The punch 20 descends to form the next notch and this punch operates to form these notches in succession, thereby producing the connected partly severed contacts 22, which are roughly formed. When the punch 23 descends, it further forms the contact 22 upon the die 14 and also produces the raised ribs 22' upon the lower face of the contact. The formed contacts remain connected, as stated, and the leading contact is arranged over the metallic member or spring 27, which has been fed upon the lower stationary electrode 26. This leading contact 22 is inclined and its leading lower end contacts with the member or spring 27. When the punches 20 and 23 descend, the cam 31 turns to place the spring 29 under tension, and the movable electrode 28 descends and engages the high end of the leading contact 22, and this engagement occurs before the blade 32 moves downwardly sufficiently to sever the web connecting the leading contact and the next contact. The blade 32 may move downwardly substantially simultaneously with the punch 23. As soon as the severing occurs, the spring 29 still under tension quickly moves the electrode downwardly and yieldingly presses the severed contact against the member 27. The high resistance ribs 22' engage the member 27, and the welding circuit is now closed and the welding occurs, and the spring 29 causes the pressure to follow through during the welding period. After this, all parts are restored to the raised position, and the member removed from the electrode 26, a new member applied thereto, and the cycle of operation is repeated.

Having thus described our invention, we claim:

1. Apparatus for forming and welding contacts to a metallic member, comprising a support for a metal rod, means to effect an intermittent step-by-step feeding movement of the rod longitudinally, a reciprocatory punch arranged to engage with the rod between the steps for forming notches in the rod which do not completely sever the rod, a reciprocatory forming punch arranged to act upon that portion of the rod between a pair of notches to form the contact and retain the same connected with the next contact, an electrode for holding a metal member and arranged near the leading end of the support to have the leading contact moved over the metal member when the rod is fed a step, a movable electrode to press the leading contact against the member, and means to sever the leading contact from the next trailing contact after the leading contact has been located wtih respect to the metallic member due to the step-by-step feeding movement of the rod longitudinally.

2. Apparatus for forming and welding contacts to a metallic member, comprising a support for a metal rod, an electrode arranged near the leading end of the support, for receiving the metallic member thereon, a reciprocatory punch arranged above the support to engage with the rod between the steps thereof for forming notches in the rod which do not completely sever the rod, a reciprocatory forming punch arranged above the support upon the leading side of the first named punch and having blades to enter a pair of notches formed in the rod to form the contact and retain the same connected with the next contact, a movable electrode to press the leading contact against the metallic member mounted upon the first named electrode, a reciprocatory element to engage within the notches formed in the rod to effect an intermittent step-by-step longitudinal feeding movement of the rod toward the first named electrode to locate the leading contact upon the metallic member, and means to sever the leading contact from the next contact after the leading contact has been located with respect to the metallic member due to the step-by-step feeding movement of the metal rod.

3. Apparatus for forming and welding contacts to a metal member, a support for a metal rod, an electrode arranged near the leading end of the support, means to effect an intermittent step-by-step longitudinal feeding movement of the rod toward the electrode, a reciprocatory punch arranged above the support to engage with the rod between the steps thereof for forming notches in the rod which do not completely sever the rod, a die arranged upon the support beneath the rod and having a groove for forming a resistance rib upon the formed contact and disposed upon the leading side of the punch, a reciprocatory forming punch arranged above the support upon the leading side of the first named punch and in cooperative relation to the die and having blades to enter a pair of notches formed in the rod for forming the contact and pressing the formed contact against the die for producing the resistance rib, a movable electrode to press the leading contact against the metallic member mounted upon the first named electrode, and a blade to sever the leading contact from the next trailing contact after the leading contact has been located with respect to the metal member due to the intermittent step-by-step feeding movement of the rod.

4. Apparatus for forming and welding contacts to a metal member, comprising a support which inclines downwardly toward its leading end, the support receiving thereon a metal rod extending longitudinally of the support, a stationary electrode arranged near the leading end of the support and having its upper face disposed at an elevation below the inclined supporting face of the support, the stationary electrode being adapted to support a metallic member, means to intermittently feed the rod longitudinally of the support toward the stationary electrode for locating a leading contact over and in contact with the metallic member upon the stationary electrode, a reciprocatory punch operating at a fixed position for forming spaced notches in the rod which do not sever the rod, a reciprocatory forming punch operating at a fixed position upon the leading side of the first named punch for forming the contact between each pair of notches without severing the contact from the companion contacts, an upper movable electrode to press the leading contact toward the metal member, resilient means to move the movable electrode, and means to sever the high end of the inclined leading contact from the next trailing contact after the leading contact has been located with respect to the metal member due to the intermittent feeding movement of the rod.

5. A method for forming and welding contacts to a metal member, comprising supporting a metal member at a given position, supporting a metal rod and inclining the same longitudinally downwardly toward the supported metal member, effecting an intermittent longitudinal step-by-step feeding movement of the inclined rod toward the member to bring the leading formed inclined contact in overlapping relation with the metal member and its leading lower end in substantial contact therewith, forming spaced notches in the rod without severing the rod, forming the contact between each pair of notches without severing such contact from the rod, yieldingly pressing a movable electrode into engagement with the leading contact in a direction toward the metal member, severing the high end of the inclined leading formed contact from the next contact after the leading contact has been located with respect to the metallic member due to the intermittent feeding movement of the rod, welding the severed formed contact to the metal member while continuing the pressure of the movable contact toward the metal member.

6. A method for forming and welding contacts to a metal member, comprising supporting the metal member at a given position, supporting a metal rod and inclining the same longitudinally downwardly toward the supported metal member, effecting an intermittent longitudinal step-by-step feeding movement of the inclined rod toward the metal member and bringing a leading formed contact in overlapping relation with the metal member and inclined with relation thereto forming spaced notches in the rod without severing the rod, forming the contact between each pair of notches without severing such contact from the rod, yieldingly pressing the leading inclined contact in a direction toward the metal member, severing the high end of the inclined leading contact from the next contact and continuing the yielding pressure while subjecting the severed contact and the member to the action of a welding current.

7. A method of forming and welding contacts to a metal member, comprising forming a longitudinal group of contacts connected by intermediate webs, supporting a metallic member at a given position, supporting the longitudinal group of connected contacts in an inclined position extending downwardly toward the supported member, effecting an intermittent step-by-step longitudinal feeding movement of the group to bring the leading contact while held inclined above the supported member so that the low end of such contact may engage the metallic member and the high end of such contact be spaced from such metallic member, severing the high end of the leading contact from the next contact, and exerting a pressure upon the leading contact toward the metallic member before and after the severing step, and welding the leading contact to the metal member.

8. The method of forming and welding contacts to metallic members, comprising supporting a metallic member at a desired elevation, supporting at an inclination with respect to the metallic member and at an elevation above the metallic member a longitudinal group of formed contacts connected by reduced portions, feeding the group longitudinally a step for bringing the leading vertically inclined contact over the metallic member so that the lower end of the contact may engage the metallic member and the high end of the contact is spaced from the metallic member, yieldingly pressing the leading inclined contact toward the metallic member, severing the high end of the leading contact from the rod, and welding the leading contact to the member.

9. Apparatus for forming and welding contacts to a metal member, a support for a metal rod, means to effect an intermittent step-by-step movement of the rod, means to act upon the rod between the steps for forming thereon a longitudinal group of connected contacts, a stationary electrode arranged near the leading end of the support for receiving a metal member so that the leading contact may be arranged in overlapping relation therewith at the end of the intermittent step, a movable electrode to engage the leading contact, a spring connected with the movable electrode, means to act upon the spring to place the same under tension, and a blade separate from the movable electrode to sever the leading contact from the next contact after the leading contact has been located with respect to the metal member due to the step by step feeding movement of the metal rod.

10. Apparatus for forming and welding contacts to metallic members, comprising a vertically inclined support, an electrode arranged adjacent to the lower discharge end of the inclined support and having a substantially horizontal face arranged at an elevation beneath the upper face of the inclined support, the inclined support receiving thereon a metal rod, forming punch means for acting upon the rod upon the support for producing contacts secured to each other and to the rod by thin webs, an element engaging one contact to feed the rod longitudinally and bring the inclined leading contact over the metallic member so that the lower end of the leading contact engages the metallic member and the high end is spaced from such metallic member, a spring pressed electrode for engaging the leading contact and forcing it toward the metallic member, and a blade to sever the high end of the leading inclined contact after the leading contact has been located with respect to the metallic member due to the longitudinal movement of the metal rod.

11. Apparatus for forming and welding contacts to metallic members, comprising a vertically inclined support for receiving a metal rod thereon and including a die for forming tapered resistance elements, forming punch means for acting upon the rod upon the support for producing a contact attached to the rod and co-acting with the die for forming the tapered resistance elements upon the lower face of the contact, an electrode arranged near and beyond the lower discharge end of the inclined support and having a substantially horizontal face disposed at an elevation below the upper face of the inclined support, said electrode receiving the metallic member thereon which will be held thereby so that its upper face is at an elevation below the upper face of the inclined support so that when the rod is shifted longitudinally toward the electrode the leading end of the contact will engage the metallic member and its high trailing end will be spaced from the metallic member, a spring pressed electrode movable toward the first named electrode for forcing the contact toward the metallic member, and a blade to sever the high end of the contact from the rod after the contact has been located with respect to the metallic member due to the longitudinal movement of the rod.

12. Apparatus for forming and welding contacts to metallic members, comprising a vertically inclined support for receiving a metal rod thereon and including a die for forming resistance elements, forming punch means for acting upon the rod upon the inclined support for producing a contact attached to the rod and co-acting with the die for forming the resistance elements upon the lower face of the contact, an electrode arranged near the lower discharge end of the inclined support and having a substantially horizontal face and receiving thereon the metallic member, means engaging the rod to feed the same longitudinally toward the lower end of the inclined support so the contact will be arranged in overlapping relation to the metallic member and its lower end substantially contact therewith and its raised end be spaced therefrom, an upper electrode arranged in opposed relation to the lower electrode, resilient means to move the upper electrode toward the lower electrode to press the contact toward the metallic member, and a blade separate from the upper electrode and serving to sever the raised end of the contact from the rod after the contact has been located with respect to the metallic member due to the longitudinal feed of the rod.

13. A method of forming a contact and welding the same upon a metallic member, comprising forming a portion of a rod for providing a contact attached to the rod, supporting the metallic member at a given elevation, supporting the rod and attached contact at an elevation above the metallic member and inclined with relation thereto, moving the rod to bring the contact over the metallic member with the lower end of the contact substantially engaging the metallic member and its raised end spaced therefrom, exerting a resilient pressure upon the contact to force the same toward the metallic member, severing the raised end of the contact while it is subjected to the resilient pressure, and then subjecting the contact and metallic member to the action of a welding current.

14. Apparatus for forming and welding contacts to a metallic member, comprising a support for a metal rod, punch means arranged to engage the rod upon the support for forming contacts which are attached to each other and to the rod, an electrode arranged near the discharge end of the support for holding the metallic member so that the leading contact may be passed over the metallic member, a movable element to engage with one contact to shift the rod longitudinally toward the electrode, a second electrode to engage with the leading contact and force the same toward the first named electrode, and resilient means to move the second electrode toward the first named electrode so that the pressure will follow through during the welding period.

15. Apparatus for forming and welding contacts to a metal member, comprising a support for a metal rod, punch means arranged to engage the rod upon the support for forming a contact remaining attached to the rod, a supporting member arranged near the discharge end of the support for holding the metallic member so that the formed contact may be arranged in overlapping relation to the metallic member, means to effect an intermittent longitudinal movement of the rod toward the supporting member to thereby locate the formed contact with respect to the metallic member, a contact engaging member disposed opposite to the supporting member, means to effect a relative closing movement of the supporting member and the contact engaging member, a blade to sever the formed contact from the rod after the contact has been located with respect to the metallic member, and means to supply a welding current to the formed contact when it is being pressed against the metallic member by the supporting member and the contact engaging member.

ALBERT F. PITYO.
HARRY E. BUTTERFIELD, Jr.

REFERENCES CITED

The following references are of record in the file of this patent:

UNITED STATES PATENTS

| Number | Name | Date |
|---|---|---|
| 1,806,188 | Adams | May 19, 1931 |
| 2,024,597 | Pfeiffer | Dec. 17, 1935 |
| 2,129,845 | King et al. | Sept. 13, 1938 |
| 2,164,553 | Tear | July 4, 1939 |
| 2,218,197 | Hall | Oct. 15, 1940 |
| 2,263,294 | Fenke | Nov. 18, 1941 |
| 2,388,754 | Martindell | Nov. 13, 1945 |